US008334946B2

(12) United States Patent  
Karakawa

(10) Patent No.: US 8,334,946 B2  
(45) Date of Patent: Dec. 18, 2012

(54) LASER ILLUMINATED BACKLIGHT FOR LIQUID CRYSTAL DISPLAYS

(75) Inventor: Masayuki Karakawa, Newmarket, NH (US)

(73) Assignee: Corporation For Laser Optics Research, Portsmouth, NH (US)

( * ) Notice: Subject to any disclaimer, the term of this patent is extended or adjusted under 35 U.S.C. 154(b) by 471 days.

(21) Appl. No.: 12/688,092

(22) Filed: Jan. 15, 2010

(65) Prior Publication Data

US 2010/0182536 A1    Jul. 22, 2010

Related U.S. Application Data

(60) Provisional application No. 61/205,380, filed on Jan. 16, 2009.

(51) Int. Cl.  
*G02F 1/1335* (2006.01)

(52) U.S. Cl. ............................. 349/65; 349/62; 362/97.2

(58) Field of Classification Search .................. 349/62, 349/65; 362/97.2  
See application file for complete search history.

(56) References Cited

U.S. PATENT DOCUMENTS

| | | | |
|---|---|---|---|
| 4,599,730 A | 7/1986 | Eden et al. | |
| 4,603,421 A | 7/1986 | Scifres et al. | |
| 5,715,021 A | 2/1998 | Gibeau et al. | |
| 5,774,487 A | 6/1998 | Morgan | |
| 5,976,686 A * | 11/1999 | Kaytor et al. | 428/317.9 |
| 5,990,983 A | 11/1999 | Hargis et al. | |
| 6,011,643 A | 1/2000 | Wunderlich et al. | |
| 6,154,259 A | 11/2000 | Hargis et al. | |
| 6,172,809 B1 * | 1/2001 | Koike et al. | 359/485.04 |
| 6,283,597 B1 | 9/2001 | Jorke | |
| 6,304,237 B1 | 10/2001 | Karakawa | |
| 6,490,104 B1 * | 12/2002 | Gleckman et al. | 359/819 |
| 6,590,698 B1 | 7/2003 | Ohtsuki et al. | |
| 6,939,027 B2 | 9/2005 | Harumoto | |
| 6,975,294 B2 | 12/2005 | Manni et al. | |

(Continued)

FOREIGN PATENT DOCUMENTS

EP    0 603826 A1    6/1994

(Continued)

OTHER PUBLICATIONS

"Vikuti# Dual Brightness Enhancement Film II (DBEF II)", Data Sheet, 3M Optical Systems, retrieved from http://multimedia.mmm.com/mws/mediawebserver. dyn?6666660Zjcf6IVs6EVs66SCc8COrrrrQ- on Jun. 2, 2010.

*Primary Examiner* — Michael Caley  
(74) *Attorney, Agent, or Firm* — Foley & Lardner LLP; Edward A. Gordon

(57) ABSTRACT

A flat panel display includes a backlight with a plurality of lasing elements. A light distributor distributes light from the lasing elements across the flat panel display. In edge-lit backlights, the light distributor may be a light guide. In direct-lit backlights, the light distributor may be one or more light diffusers that randomize the polarization of light. A polarization enhancement film increases the polarization of light from the light distributor by allowing light of a first polarization to pass through the film and reflecting light that is not of the first polarization back into the backlight. The light reflected back into the backlight is randomly re-polarized within the backlight. An array of light modulators arranged across the flat panel display modulates light emitted by the backlight.

24 Claims, 6 Drawing Sheets

U.S. PATENT DOCUMENTS

| | | | |
|---|---|---|---|
| 2006/0038939 A1* | 2/2006 | Okada | 349/110 |
| 2007/0040950 A1* | 2/2007 | Jung | 349/5 |
| 2007/0236960 A1* | 10/2007 | Anderson et al. | 362/627 |
| 2008/0094845 A1* | 4/2008 | Kusano et al. | 362/339 |
| 2008/0306719 A1* | 12/2008 | Freier | 703/13 |
| 2009/0109658 A1 | 4/2009 | Karakawa | |
| 2010/0149222 A1 | 6/2010 | Welford et al. | |

FOREIGN PATENT DOCUMENTS

| | | |
|---|---|---|
| WO | WO-95/20811 A1 | 8/1995 |
| WO | WO-2006/059264 A1 | 6/2006 |
| WO | WO-2007/049823 A1 | 5/2007 |
| WO | WO-2007/083805 A1 | 7/2007 |
| WO | WO-2007/094304 A1 | 8/2007 |

* cited by examiner

LASER ILLUMINATED BACKLIGHT FOR LIQUID CRYSTAL DISPLAYS

CROSS REFERENCE TO RELATED APPLICATIONS

This application claims the benefit of U.S. Provisional Application Ser. No. 61/205,380, filed Jan. 16, 2009, the entire contents of which are incorporated herein by reference.

BACKGROUND OF THE INVENTION

Red, green, and blue (RGB) lasers offer demonstrable benefits over fluorescent lamps and light emitting diodes for high-performance imaging applications. Greater color saturation, contrast, sharpness, and color-gamut are among the most compelling attributes distinguishing laser displays from conventional imaging systems.

To compare laser illumination technology with conventional technologies, it is instructive to examine two fundamental parameters which relate to their ultimate practicality. The first parameter can be defined as optical efficiency—in this case, the lumens of output per watt of input to the light source. The second is cost compatibility, that is, the extent to which the technology in question yields a cost effective solution to the requirements of a specific application.

Based on these parameters, a red/green/blue (RGB) semiconductor/microlaser system, consisting of three lasers or laser arrays, each operating at a fundamental color, appears to be the most efficient, high brightness, white light source for display applications to date. Semiconductor laser operation has been achieved from the UV to the IR range of the spectrum, using device structures based on InGaAlN, InGaAlP and InGaAlAs material systems. Desirable center wavelength ranges are 610-635 nm for red, 525-540 nm for green, and 445-470 nm for blue.

Laser radiation is inherently narrow band and gives rise to the perception of fully-saturated colors. Unfortunately, narrow band light incident on random rough surfaces also introduces an unacceptable image artifact known as "speckle". The visual effects of speckle detract from the aesthetic quality of an image and also result in a reduction of image resolution. Consequently, in the context of high resolution display systems, it is generally deemed essential that speckle be eliminated. A variety of "de-speckling" techniques can be used to reduce this artifact to "acceptable levels", but only at the expense of a further loss in efficiency, which negatively impacts cost, reliability, package size, and power consumption.

Known speckle reduction techniques tend to disturb the spatial or temporal coherence of laser beams through optical path randomization and/or spectral broadening. However, most of these solutions are expensive and technically complex, relying, for example, on mode-locking techniques to produce very short pulses in the order of 1 ps to increase the optical bandwidth. Ideally, the spectral bandwidth for a display light source should be on the order of several nanometers (i.e., 5-15 nm). Such a light source could be considered quasi-monochromatic—sufficiently broadband for the cancellation of speckle yet sufficiently narrow band for color purity.

SUMMARY OF THE INVENTION

The invention is directed to a polarization enhancement film for liquid crystal displays (LCDs).

According to one aspect of the invention, a flat panel display includes a backlight with a plurality of lasing elements. A light distributor substantially distributes the light output by the plurality of lasing elements across the flat panel display. In some embodiments, the lasing elements may be positioned adjacent to the light distributor for an edge-lit backlight, and the light distributor may be a light guide. In alternative embodiments, the backlight is direct-lit, and the lasing elements may be mounted on a highly reflective rear reflector in a rectangular array between the reflector and the light distributor. In direct-lit embodiments, the light distributor may be one or more light diffusers.

A polarization enhancement film increases the polarization of light from the light distributor by allowing light of a first polarization to pass through the film. Light that is not of the first polarization is reflected back into the backlight for random re-polarization within the backlight. The flat panel display also includes an array of light modulators arranged across the flat panel display for modulating light emitted by the backlight. The light modulated by the light modulators illuminates a liquid crystal display (LCD) panel.

Further features and advantages of the present invention will be apparent from the following description of preferred embodiments and from the claims.

BRIEF DESCRIPTION OF THE DRAWINGS

The following figures depict certain illustrative embodiments of the invention in which like reference numerals refer to like elements. These depicted embodiments are to be understood as illustrative of the invention and not as limiting in any way.

DETAILED DESCRIPTION OF CERTAIN ILLUSTRATED EMBODIMENTS

To provide an overall understanding of the invention, certain illustrative embodiments will now be described, including a polarization enhancement film for liquid crystal displays (LCDs). However, it will be understood by one of ordinary skill in the art that the apparatus described herein may be adapted and modified as is appropriate for the application being addressed and that the systems and methods described herein may be employed in other suitable applications, and that such other additions and modifications will not depart from the scope hereof.

Figure 1:
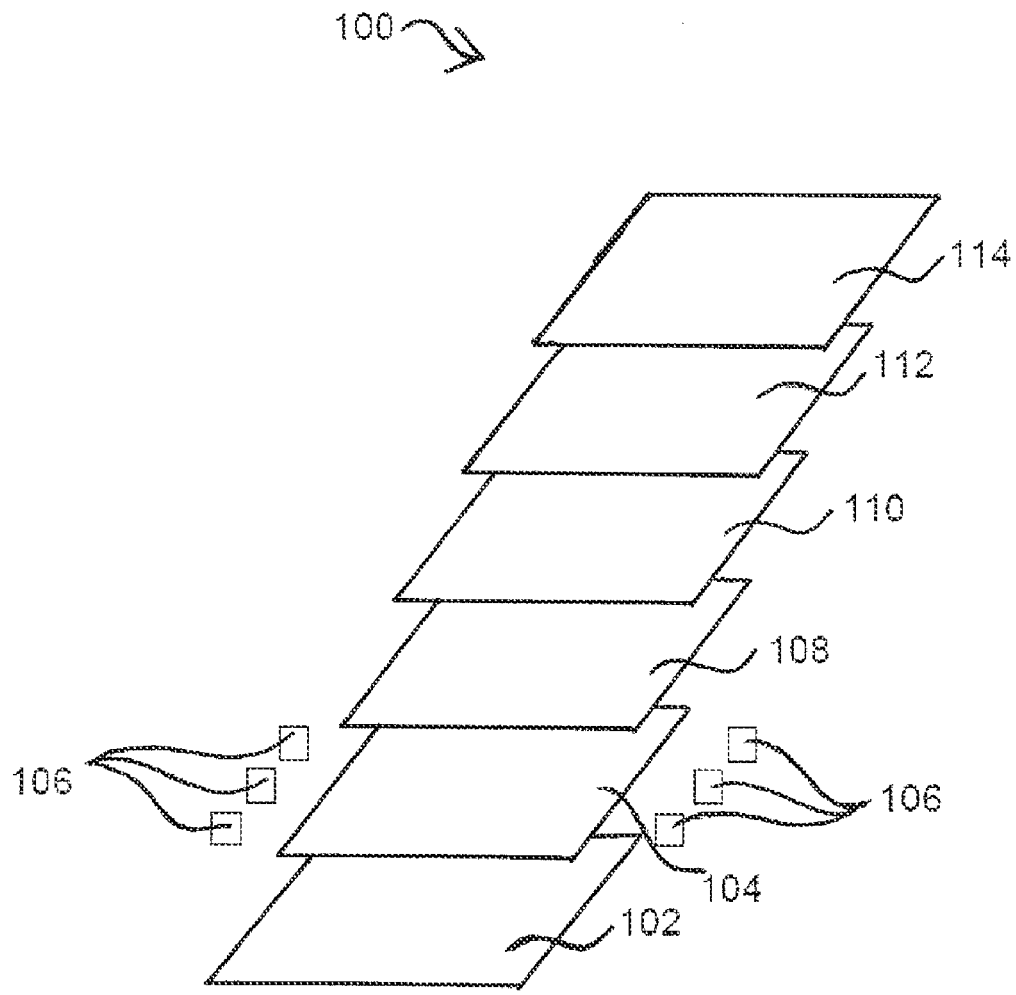
FIG. 1 shows schematically the layers of a liquid crystal display (LCD) screen.

FIG. 1 shows schematically the layers of a liquid crystal display (LCD) screen 100, according to an illustrative embodiment of the invention. At the back is a reflector 102 for directing light toward the front of the display. Light from the reflector passes through a light distributor 104, usually made of molded transparent or white plastic. In some embodiments, laser assemblies 106, which provide light for the display, may be positioned adjacent to the light distributor 104 for an edge-lit backlight. In edge-lit backlights, the light distributor 104 may be a light guide, around which the laser assemblies 106 may be arranged in various configurations. In one implementation, the light guide has a plurality of microlenses molded into its surface to aid in extracting light at predetermined points. Suitable light guides can be obtained, for example, from Global Lighting Technologies (headquartered in Brecksville, Ohio). The laser assemblies 106 emit light into the light guide, which then distributes the light across the display. The light guide also serves to mix the light from the various laser assemblies 106 to achieve a generally white light source. Optionally, a diffuser sheet 108 may be used with the light guide to further diffuse light across the display.

In an alternative embodiment, the backlight is direct-lit, and the laser assemblies 106 are mounted on a highly reflective rear reflector in a rectangular array between the reflector 102 and the light distributor 104. In direct-lit backlights, the light distributor 104 may be one or more light diffusers that randomize the polarization of light. In one implementation, the light distributor 104 may be an upper and lower light diffuser. Light diffusers may be incorporated in the backlight as well as between the backlight and a polarization enhancement film. Throughout the remainder of the description, the invention will be discussed in the context of edge-lit embodiments. However, it should be understood that the concepts apply to direct-lit embodiments as well.

After passing through the light distributor 104 (and the diffuser sheet 108, if used in edge-lit embodiments), light passes through two optical films, a brightness enhancing film 110 for directing light toward the viewer (for example, BEF II-T, which can be obtained under the brand name Vikuiti from 3M, headquartered in St. Paul, Minn.), and a polarization enhancement film 112. After passing through the optical films, light illuminates an LCD panel 114. LCD panels can be obtained, for example, from Sharp (headquartered in Osaka, Japan) and Samsung (headquartered in Seoul, Korea). The LCD panel 114 will be described further in relation to FIG. 3.

In one embodiment, the polarization enhancement film 112 is a DBEF II film, which can be obtained from 3M under the brand name Vikuiti. The DBEF II film is made of a polymeric, birefringent material and increases the brightness of the display by managing the polarization of light. In another embodiment, the polarization enhancement film 112 is a Brewster angle film. The polarization enhancement film 112 "recycles" undesirably polarized light, as will be described in FIG. 3, allowing light with the desired polarization to pass, thereby enhancing the total amount of light with the desired polarization reaching the LCD panel. The polarization enhancement film 112 will be discussed in further detail in FIGS. 3-5.

As mentioned above, laser illumination typically results in image speckle. However, as disclosed in U.S. Pat. No. 6,975,294, entitled Systems and Methods for Speckle Reduction through Bandwidth Enhancement, laser light sources formed from multiple lasers with certain frequency and bandwidth characteristics reduce if not eliminate speckle. The critical parameters for designing a bandwidth-enhanced laser array (BELA) include the number n of emitters in the array, the center wavelength $\lambda_{0i}$ of each emitter, the spectral separation $S_i$ between the center wavelength $\lambda_{0i}$ of an emitter i and the center wavelength $\lambda_{0j}$ of an emitter j being closest in wavelength, the respective bandwidth $\Delta\lambda_i$ of the individual emitters, and the relative output power $A_i$ of each emitter.

Figure 2A:
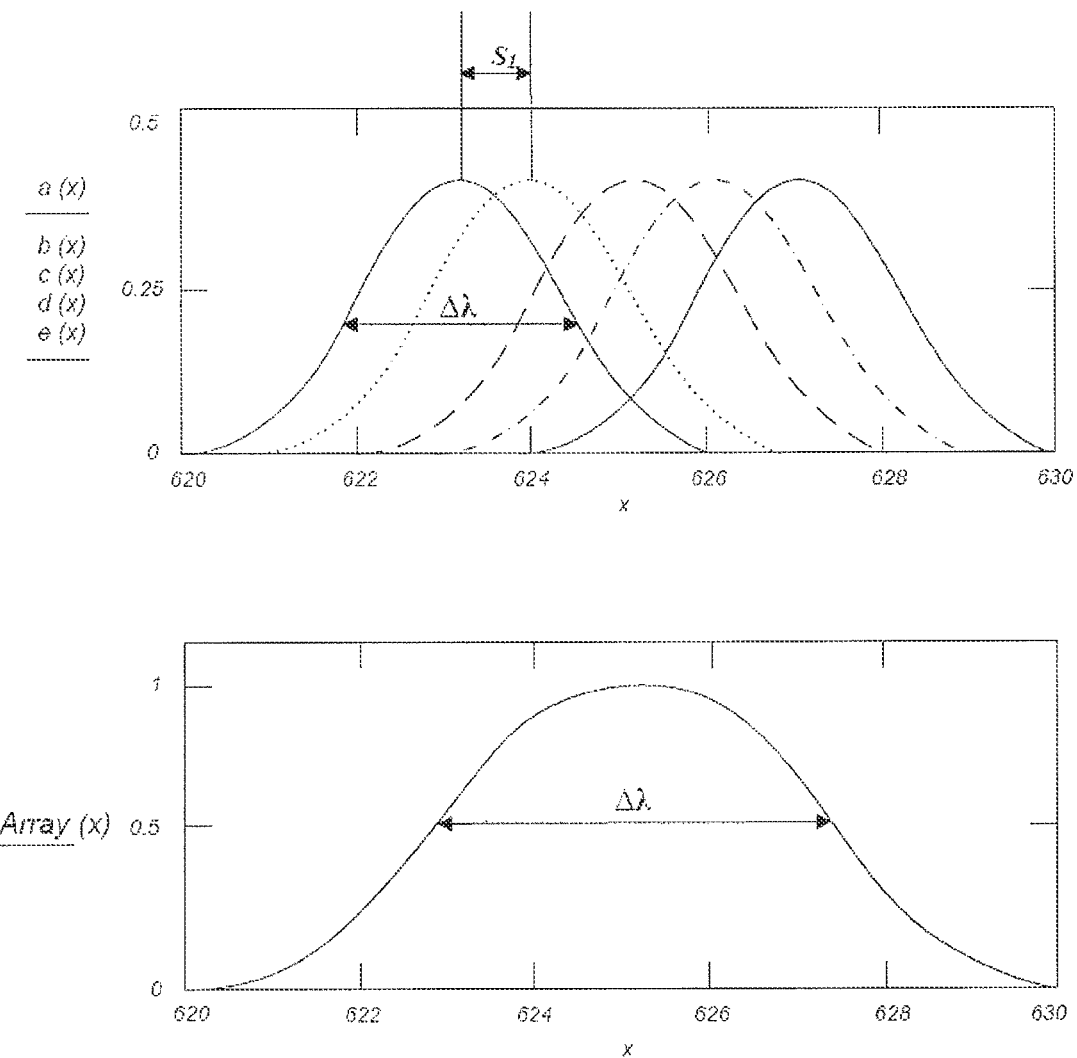
FIG. 2A shows schematically the spectral emission and the ensemble spectrum of five exemplary lasing elements having a mean spectral overlap parameter $\gamma > 1$.
Figure 2B:
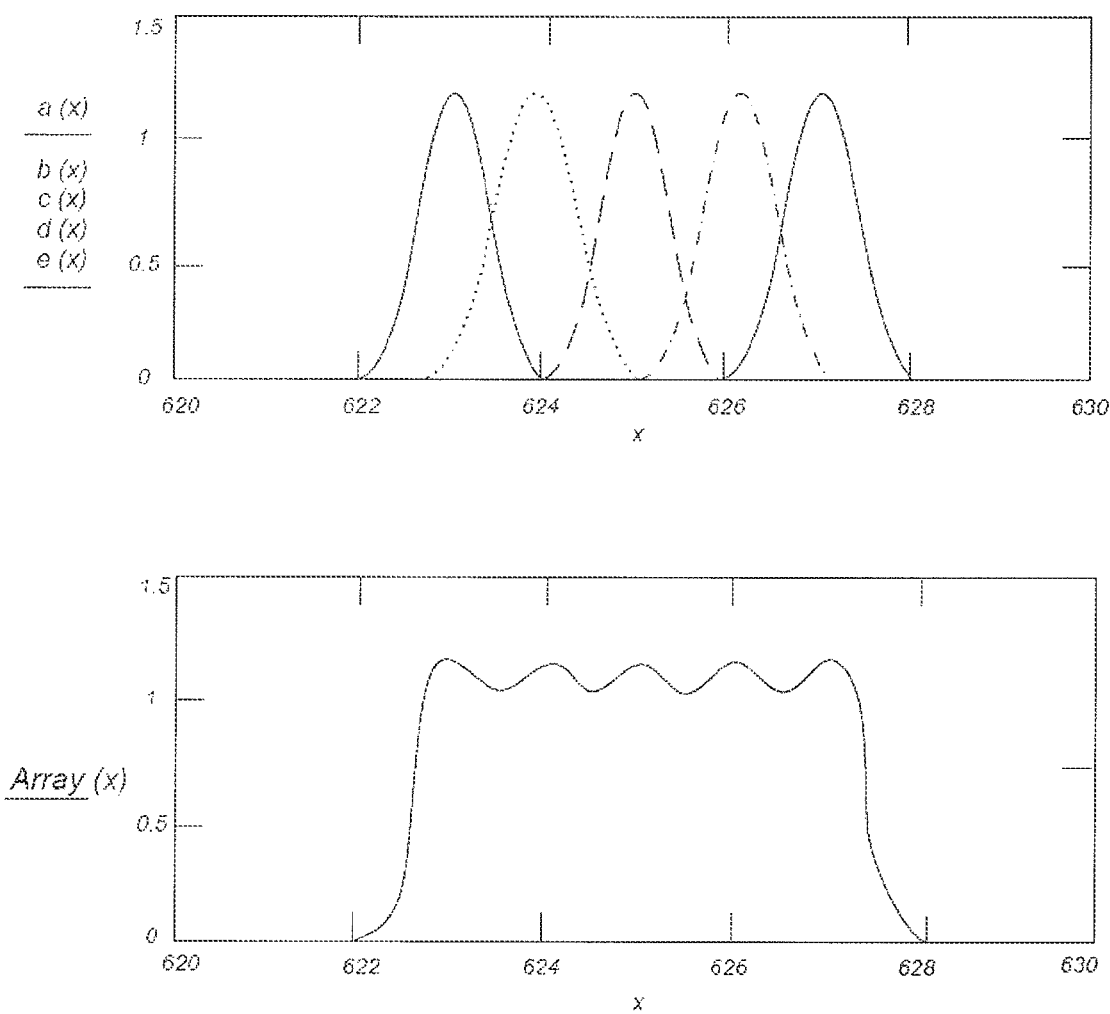
FIG. 2B shows schematically the spectral emission and the ensemble spectrum of five exemplary lasing elements having a mean spectral overlap parameter $\gamma = 1$.

FIGS. 2A and 2B depict the frequency and bandwidth characteristics of suitable laser light sources. Specifically, FIGS. 2A and 2B depict ensemble spectra of bandwidth-enhanced laser light produced from an array of spatially separated, discrete emitters of laser radiation. Each emitter has a respective spectral bandwidth $\Delta\lambda_i$ centered at some arbitrary red, green or blue wavelength $\lambda_{0i}$. The emitters of a particular color of laser light are designed to have slightly different central wavelengths, thereby creating an ensemble bandwidth $\Delta\Lambda$ which is greater than the bandwidth $\Delta\lambda_i$ of any individual emitter. By engineering the amount of ensemble bandwidth $\Delta\Lambda$ required for the cancellation of speckle, the quasi-monochromatic property responsible for the appearance of fully-saturated color is preserved. A mean spectral overlap parameter $\gamma = \overline{\Delta\lambda_i}/\overline{S_i}$, where $\overline{\Delta\lambda_i}$ is the mean spectral bandwidth of the emitters and $\overline{S_i}$ is the mean wavelength shift between center wavelengths as described above, can be associated with the ensemble wavelength characteristic of an array of emitters of a particular color. In a first scenario with $\gamma > 1$, shown in FIG. 2A, there exists substantial overlap in the spectra from the individual emitters (top FIG. 2A). The resulting ensemble spectrum $\Lambda$ is a smoothly varying function of wavelength and virtually free of any spectral features from the individual emitters (bottom FIG. 2A). This condition may be considered "ideal" for bandwidth enhancement since the spectral averaging that occurs produces a uniformly broadened distribution for $\gamma \gg 1$ and a large number of emitters, thereby minimizing speckle.

For $\gamma = 1$, as depicted in FIG. 2B, the ensemble spectrum $\Lambda$ shown at the bottom of FIG. 2B becomes a rippled function with local maxima coincident with the central wavelengths $\lambda_{0i}$ of the individual emitters. Values of $\gamma$ less than 1 have been found to be less efficient for reducing speckle than values of $\gamma$ greater than 1. Simulations using Fourier analysis suggest that coherent interference may be even more effectively suppressed with a non-uniform distribution of emitter intensities, with the possibility of eliminating speckle noise altogether.

The light source of the invention has a few advantages over the existing technologies used for the backlight for a liquid crystal flat panel display:

Compared to traditional cold cathode fluorescent lamps (CCFLs) or recently available light emitting diodes (LEDs), the lasers, generally speaking, can provide more saturated and expanded color gamut which is fully compatible with xvYCC standard for extended color space for moving pictures. The lasers can also provide highly-polarized and well-collimated beams which aid to increase the transmission efficiency and/or image contrast.

However, the traditional lasers used as a light source also generate unacceptable image artifact known as speckle, and often used de-speckling techniques or methods tend to reduce the aforementioned merits.

The laser light source design of the invention, on the other hand, relies on the aforementioned increased spectral bandwidth of the array of laser emitters to reduce speckle directly at the laser source. This is particularly beneficial when used in combination with liquid crystal flat panels because these flat panel displays usually do not have enough space (i.e. depth) to adopt additional de-speckling optics or devices.

In addition, the entire system's reliability, as measured in its mean time between failure (MTBF), can be improved by operating the array of laser emitters at less than their maximum rated output power, while still providing the cumulative laser power required to produce needed brightness. Accordingly, the array of lasers is expected, over time, to exhibit an inherently slower rate of performance degradation than a single, high power laser.

Therefore, the multiple array of laser emitters design described in the invention has an enormous advantage when used as a backlight unit for a liquid crystal flat panel display.

Figure 3:
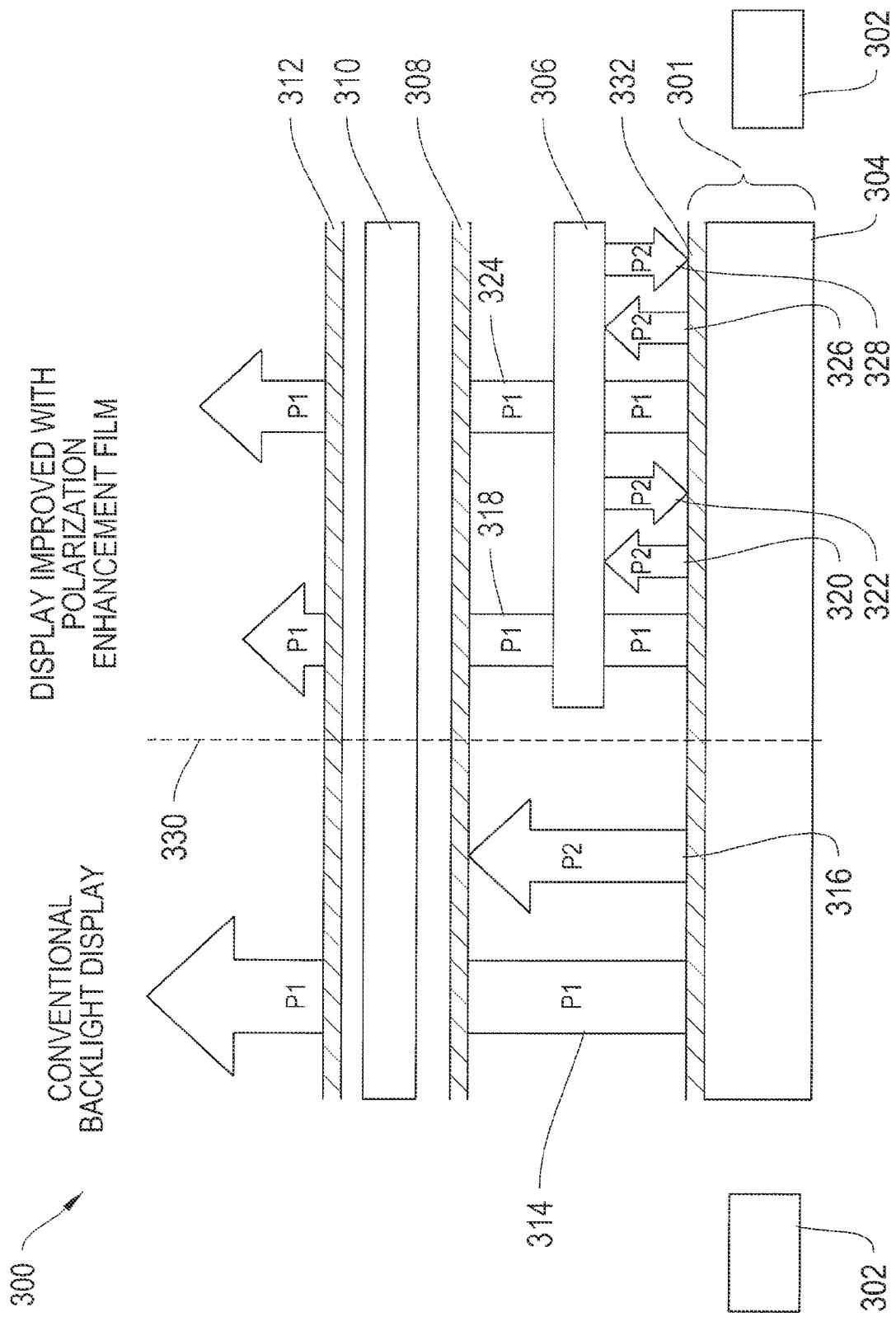
FIG. 3 shows schematically the increase in the amount of polarized light that reaches the LCD panel with the addition of a polarization enhancement film in a display according to an illustrative embodiment of the invention.

FIG. 3 shows schematically the increase in the amount of polarized light that reaches the LCD panel with the addition of a polarization enhancement film in a display 300 according to an illustrative embodiment of the invention. In one configuration, the display is illuminated by a backlight 301 that includes a light guide 304 surrounded along its edges by laser assemblies 302. In one implementation, the light guide includes an array of microlenses 332 formed on or molded into a forward facing surface of the light guide. In alternative implementations, the backlight includes a highly reflective rear reflector, such as reflector 102 of FIG. 1, instead of, or in addition to, having the microlenses 332 molded on or into the light guide. Optionally, the backlight 304 also includes a diffuser sheet (not shown) to diffuse the light emitted from the backlight 304.

To the left of the dotted line 330 is a conventional backlight display with a laser-lit backlight 304 and an LCD panel. As is known in the art, the LCD panel includes a bottom polarizer 308, a liquid crystal panel 310, and a top polarizer 312. The bottom polarizer 308 allows light of a first polarization P1 to pass through, and the liquid crystal panel 310 modulates the light in a manner dependent on an applied voltage. Light that is not of the first polarization P1 is absorbed by the bottom polarizer 308 as heat. The light modulated by the liquid crystal panel 310 passes through the top polarizer 312 to the viewer. To the left of the dotted line 330, a beam of light 314 with polarization P1 is emitted from the backlight 304. Since the beam of light 314 is of the desired polarization P1, it is passed through bottom polarizer 308, modulated in the liquid crystal panel 310, and passed through top polarizer 312 to the viewer. Another beam of light 316 with a different polarization P2 is also emitted from the backlight 304. Since the polarization P2 is not the desired polarization, the beam of light 316 is absorbed by bottom polarizer 308 as heat and is not modulated by the liquid crystal panel 310. The absorption of light as heat is an inefficiency in the LCD display 300.

As mentioned above in FIG. 1, the polarization enhancement film "recycles" incident polarized light to enhance the total amount of light with the desired polarization reaching the LCD panel. To the right of the dotted line 330 in FIG. 3 is an LCD display improved with a polarization enhancement film 306 according to an illustrative embodiment of the invention. In this embodiment, the display 300 has laser assemblies 302, a backlight 304, a polarization enhancement film 306, a bottom polarizer 308, a liquid crystal panel 310, and a top polarizer 312. The polarization enhancement film 306, liquid crystal panel 310, and polarizers 308 and 312 allow light 318 of a particular polarization P1 from the backlight 301 to pass through to the viewer. Light 320 of a different polarization P2 is reflected back into the backlight 301 by the polarization enhancement film 306 as light 322. This polarization of this "recycled" light 322 is randomized by passing through the light guide 304 in the backlight 301 and reflecting off a rear reflector (not shown). (In the case of a direct-lit backlight, the polarization of the "recycled" light is randomized during its reflection off a rear reflector.) Therefore, the recycled light 322 after reflection in the backlight 301 includes light of polarization P1 324 and P2 326, respectively. The light 324 with polarization in the P1 orientation passes through the polarization enhancement film 306 to the bottom polarizer 308 and eventually to the viewer. The light 326 that is still of orientation P2 is once again reflected by the polarization enhancement film 306 and sent back as light 328 into the backlight 301. The process continues, and thus while little of light 316 having a P2 polarization on the display left of line 330 eventually passes to bottom polarizer 308, a meaningful portion of such light 320 on the right hand side of the line would.

The recycling of light by the polarization enhancement film 306 greatly improves the efficiency of the display 300. The advantages of using a polarization enhancement film are further enhanced and are particularly effective in laser-lit displays because laser light contains a greater percentage of light polarized in a desired direction than light emitted from traditional sources like CCFLs or LEDs.

Figure 4A:
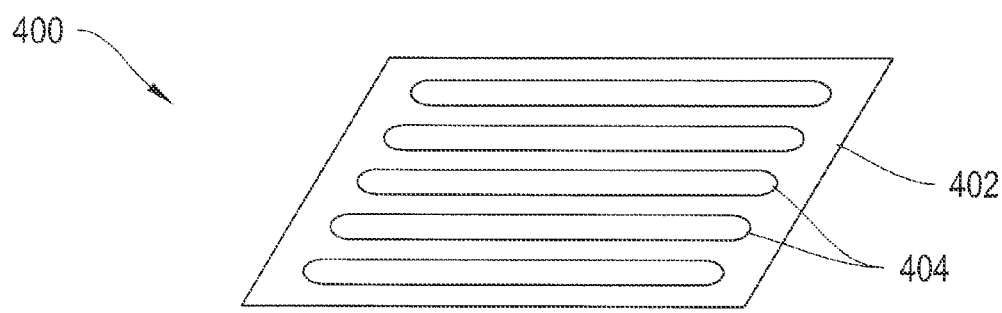
FIG. 4A shows schematically the polarization enhancement film according to an illustrative embodiment of the invention.

FIG. 4A shows schematically the polarization enhancement film according to an illustrative embodiment of the invention. As mentioned in FIG. 1, the polarization enhancement film is a Brewster angle film 400 in one embodiment. The surface 402 of the Brewster angle film 400 has prisms 404 to recycle incident light polarized perpendicular to the LCD panel polarizing filter. The prisms 404 are represented by ovals for illustrative purposes. The prisms 404 are arranged in rows across the Brewster angle film 400. In one embodiment, the pitch of the prisms 404 is equal to that of the rows of elements of the LCD panel. Suitable shapes of the prisms 404, including the Brewster angle, are further discussed in FIG. 5.

Figure 4B:
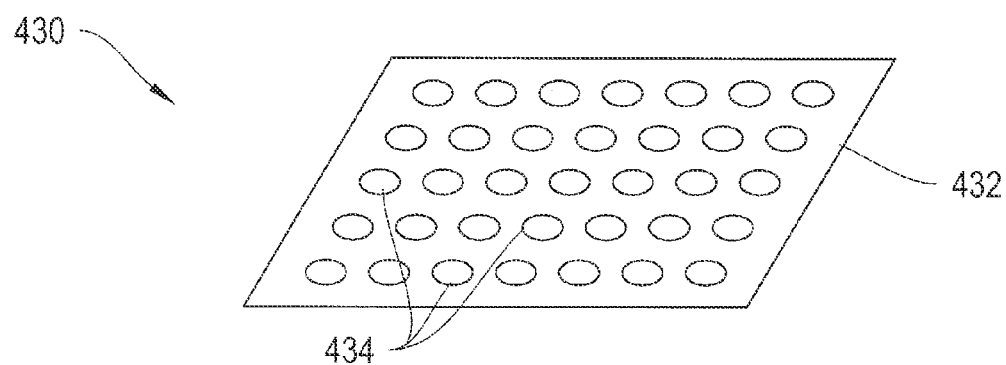
FIG. 4B shows schematically the polarization enhancement film according to a second illustrative embodiment of the invention.

FIG. 4B shows schematically a Brewster angle film 430 according to a second illustrative embodiment of the invention. The surface 432 of the Brewster angle film 430 has prisms 434 to recycle incident light polarized perpendicular to the LCD panel polarizing filter. The prisms 434 are represented by ovals for illustrative purposes. The prisms 434 are arranged in rows and columns across the Brewster angle film 430. In one embodiment, each prism 434 is positioned to correspond to a pixel in the LCD panel. Suitable shapes of the prisms 434, including the Brewster angle, are further discussed in FIG. 5.

Figure 4C:
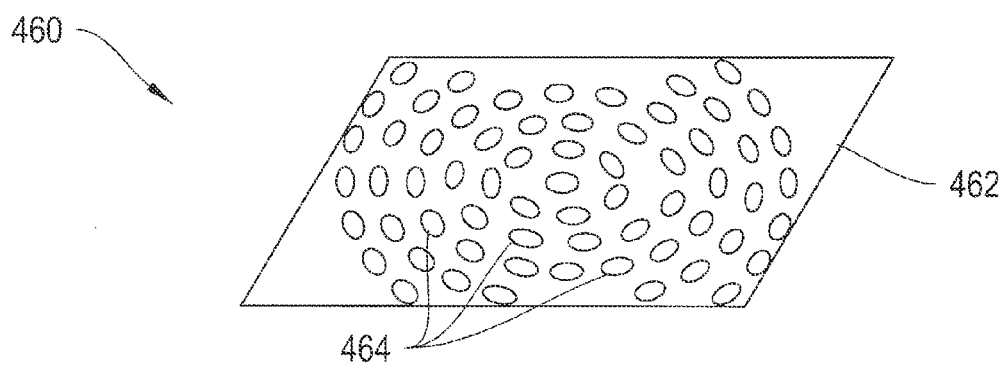
FIG. 4C shows schematically the polarization enhancement film according to a third illustrative embodiment of the invention.

FIG. 4C shows schematically a Brewster angle film 460 according to a third illustrative embodiment of the invention. The surface 462 of the Brewster angle film 460 has prisms 464 to recycle incident light polarized perpendicular to the LCD panel polarizing filter. The prisms 464 are represented by ovals for illustrative purposes. The prisms 464 are arranged in a circular pattern on the Brewster angle film 460. Suitable shapes of the prisms 464, including the Brewster angle, are further discussed in FIG. 5.

Figure 5A:
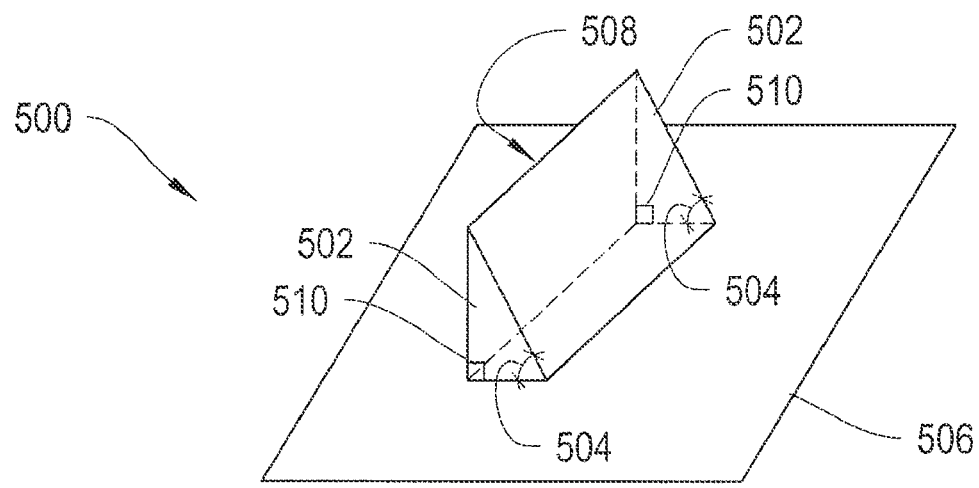
FIG. 5A shows schematically one suitable prism configuration for inclusion on the polarization enhancement film according to an illustrative embodiment of the invention.

FIG. 5A shows schematically a suitable prism configuration 500 for one of the prisms on the Brewster angle film according to an illustrative embodiment of the invention. The cross-section 502 of prism 508 is a right triangle. The angles of the cross-section 502 at the surface of the Brewster angle film 506 are a right angle 510 and the Brewster angle 504 of the material used to make the prism 508. The Brewster angle is defined to be the angle of incidence at which light with a particular polarization is perfectly transmitted through a surface, with no reflection. The Brewster angle $\theta_B$ depends on the material used to make the prism 508, and can be calculated using the equation $\theta_B = \arctan(n_2/n_1)$, where $n_1$ and $n_2$ are the refractive indices of the first and second media, respectively, through which the light is traveling. In one embodiment, the prism 508 is made of polyester and the Brewster angle is about 56°, so the angle 504 is equal to 56°.

Figure 5B:
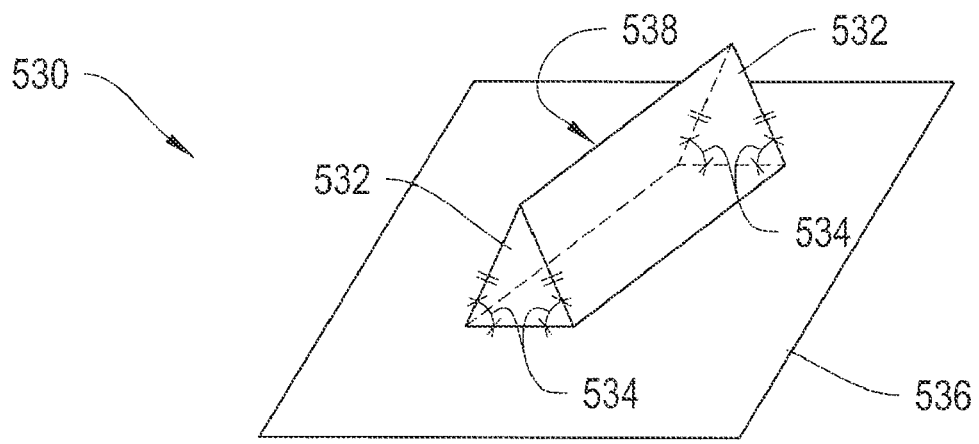
FIG. 5B shows schematically one suitable prism configuration for inclusion on the polarization enhancement film according to a second illustrative embodiment of the invention.

FIG. 5B shows schematically a suitable prism configuration 530 for one of the prisms on the Brewster angle film according to a second illustrative embodiment of the invention. The cross-section 532 of prism 538 is an isosceles triangle. The equal angles 534 of each triangle at the surface of the Brewster angle film 536 are each equal to about the Brewster angle of the material used to make the prism 538.

Figure 5C:
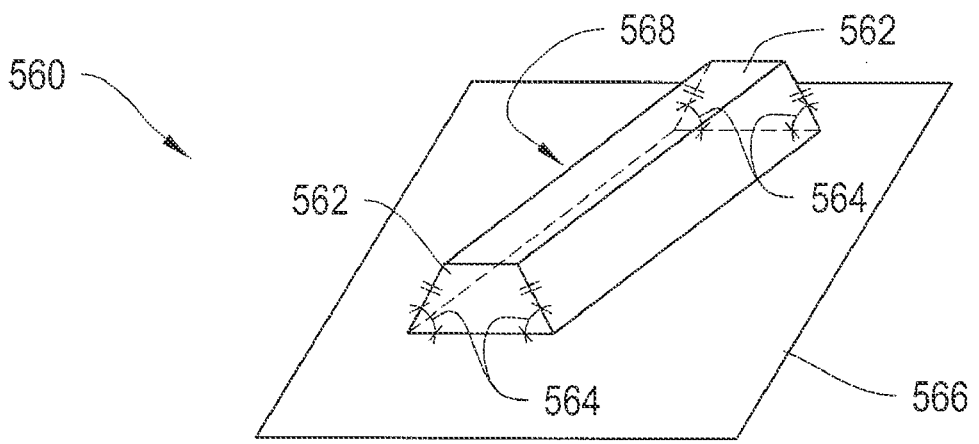
FIG. 5C shows schematically one suitable prism configuration for inclusion on the polarization enhancement film according to a third illustrative embodiment of the invention.

FIG. 5C shows schematically a suitable prism configuration 560 for one of the prisms on the Brewster angle film according to a third illustrative embodiment of the invention. The cross-section 562 of prism 568 is trapezoidal. The angles 564 of the cross-section 562 at the surface of the Brewster angle film 566 are each equal to about the Brewster angle of the material used to make the prism 568.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A flat panel display, comprising:
    a backlight including a plurality of lasing elements of at least one primary color arranged in a plurality of laser assemblies, wherein the plurality of lasing elements of at least one primary color are selected such that each lasing element emits a laser beam with a center wavelength $\lambda_{0i}$ and a spectral bandwidth $\Delta\lambda_i$, wherein the center wavelength of at least one of the lasing elements is wavelength-shifted with respect to the center wavelength of at least one other lasing element, and wherein said laser beams, when combined, have an ensemble spectrum $\Lambda$ with an overlap parameter $\gamma = \overline{\Delta\lambda_i}/\overline{S_i}$, with $\overline{\Delta\lambda_i}$ being a mean spectral bandwidth of the lasing elements and $\overline{S_i}$ being a mean wavelength shift between the center wavelengths $\lambda_{0i}$, of the at least one and the at least one other lasing elements, with $\overline{\Delta\lambda_i}$ and $\overline{S_i}$, selected such that $\gamma \geq 1$;
    a light distributor for substantially distributing light output by the plurality of lasing elements across the flat panel display;
    a polarization enhancement film that increases the polarization of light from the light distributor by:
        allowing light of a first polarization to pass through the film, and
        reflecting light that is not of the first polarization back into the backlight for random re-polarization within the backlight; and
    an array of light modulators arranged across the flat panel display for modulating light emitted by the backlight.

2. The flat panel display of claim 1, wherein the light distributor randomizes the polarization of incident light.

3. The flat panel display of claim 1, wherein the array of light modulators comprises a liquid crystal display (LCD) panel.

4. The flat panel display of claim 1, wherein the plurality of lasing elements are positioned about an exterior edge of the light distributor.

5. The flat panel display of claim 4, wherein the light distributor comprises a light guide.

6. The flat panel display of claim 1, wherein the plurality of laser assemblies of the backlight are configured to directly illuminate the array of light modulators from behind.

7. The flat panel display of claim 6, wherein the light distributor comprises a first and second light diffuser.

8. The flat panel display of claim 1, wherein the polarization enhancement film includes a plurality of prisms.

9. The flat panel display of claim 8, wherein the prisms are arranged in rows on the polarization enhancement film.

10. The flat panel display of claim 9, wherein a pitch of the prisms is less than or equal to that of the light modulators of the array of light modulators.

11. The flat panel display of claim 8, wherein the prisms are arranged in columns on the polarization enhancement film.

12. The flat panel display of claim 8, wherein the prisms are arranged in a circular pattern on the polarization enhancement film.

13. The flat panel display of claim 8, wherein the prisms are randomly positioned on the polarization enhancement film.

14. The flat panel display of claim 8, wherein cross-sections of the prisms are triangular.

15. The flat panel display of claim 14, wherein the cross-sections of the prisms are right triangles.

16. The flat panel display of claim 15, wherein the polarization enhancement film is made of a first material, and wherein the angles of a prism cross-section at a surface of the polarization enhancement film are a right angle and a Brewster angle of the first material.

17. The flat panel display of claim 16, wherein the polarization enhancement film is made of polyester and the Brewster angle is about 56°.

18. The flat panel display of claim 14, wherein the cross-sections of the prisms are isosceles triangles.

19. The flat panel display of claim 18, wherein the polarization enhancement film is made of a first material, and wherein equal angles of each triangle are each equal to about a Brewster angle of the first material.

20. The flat panel display of claim 19, wherein the polarization enhancement film is made of polyester and the Brewster angle is about 56°.

21. The flat panel display of claim 8, wherein cross-sections of the prisms are trapezoidal.

22. The flat panel display of claim 21, wherein the polarization enhancement film is made of a first material, and wherein the angles of a prism cross-section at a surface of the polarization enhancement film are each equal to about a Brewster angle of the first material.

23. The flat panel display of claim 22, wherein the polarization enhancement film is made of polyester and the Brewster angle is about 56°.

24. The flat panel display of claim 1, wherein $\overline{\Delta\lambda_i}$ and $\overline{S_i}$ are selected such that $\gamma > 1$.

* * * * *